United States Patent
Inomata et al.

(10) Patent No.: US 6,467,798 B2
(45) Date of Patent: Oct. 22, 2002

(54) VEHICULAR AIRBAG APPARATUS

(75) Inventors: Kazuyuki Inomata, Shizuoka-ken (JP); Kazumi Ono, Shizuoka-ken (JP); Yorihito Okuda, Saitama-ken (JP); Takayuki Honma, Kanagawa-ken (JP)

(73) Assignees: Nissan Motor Co., Ltd., Kanagawa (JP); Nihon Plast Co., Ltd., Shizuoka (JP); Caisonic Kansel Corporation, Tokyo (JP)

( * ) Notice: Subject to any disclaimer, the term of this patent is extended or adjusted under 35 U.S.C. 154(b) by 0 days.

(21) Appl. No.: 09/778,954

(22) Filed: Feb. 8, 2001

(65) Prior Publication Data

US 2001/0017455 A1 Aug. 30, 2001

(30) Foreign Application Priority Data

Feb. 8, 2000 (JP) .......................................... 2000-030630

(51) Int. Cl.[7] .............................................. B60R 21/16
(52) U.S. Cl. ................................... 280/728.2; 280/740
(58) Field of Search .............................. 280/740, 728.1, 280/728.2

(56) References Cited

U.S. PATENT DOCUMENTS

| | | | |
|---|---|---|---|
| 5,263,739 A | * 11/1993 | Webber et al. ........... | 280/728.2 |
| 5,332,256 A | * 7/1994 | Lauritzen et al. ........... | 280/740 |
| 5,482,313 A | * 1/1996 | Ikeya et al. .............. | 280/728.2 |
| 5,681,055 A | * 10/1997 | Green et al. ............. | 280/728.2 |

FOREIGN PATENT DOCUMENTS

JP         10-273005         10/1998

* cited by examiner

*Primary Examiner*—Eric Culbreth
(74) *Attorney, Agent, or Firm*—McDermott, Will & Emery

(57) ABSTRACT

A retainer case (4) has a lower portion (4a) defining a gas diffusion chamber (5), and an upper portion (4c) cooperating with an intermediate portion (4b) to define an accommodation chamber (6), a diffuser member (15) separates the gas diffusion chamber (5) from the air bag accommodation chamber (6), with gas communication allowed therebetween through a gas inlet (16) of the diffuser member (15), an infaltor (11) is disposed in the gas diffusion chamber (5), an airbag (8) is accommodated in the accommodation chamber (6), having a retained part (8b) in a space (S1) between the intermediate portion (4b) and the diffuser member (15), and an inward projection (18) of the intermediate portion (4b) and an inward projection (17) of the diffuser member (15) constitute a gas invasion restricting structure (17+18) for restricting a gas invasion from the gas diffusion chamber (5) into the space (S1).

11 Claims, 4 Drawing Sheets

VEHICULAR AIRBAG APPARATUS

BACKGROUND OF THE INVENTION

The present invention relates to a vehicular airbag apparatus, and particularly to a vehicular airbag apparatus of a type in which part of an airbag is retained between a portion of a retainer case and a diffuser in the retainer case.

This type of vehicular airbag apparatus has been disclosed in Japanese Patent Application Laid-Open Publication No. 10-273005.

In this conventional art, an internal space of a retainer case is partitioned by a diffuser into a gas diffusion chamber for an inflator to be disposed therein, and an accommodation chamber for accommodation of an airbag, with gas communication allowed therebetween through an opening of the diffuser. This arrangement provides a compact apparatus.

SUMMARY OF THE INVENTION

In the conventional art, however, a part of the airbag retained between a portion of the retainer case and the diffuser confronts the gas diffusion chamber, with a fear of receiving undue thermal effects of hot gases discharged from the inflator.

The present invention is made with such points in view. It therefore is an object of the present invention to provide a vehicular airbag apparatus in which a retained part of an airbag is substantially free from undue effects of hot gases.

To achieve the object, according to an aspect of the present invention, there is provided a vehicular airbag apparatus comprising: a retainer case having a first portion defining a gas diffusion chamber, a second portion defining a accommodation chamber, and a third portion between the first and second portion; a diffuser member separating the gas diffusion chamber from the accommodation chamber, with gas communication allowed therebetween through an opening of the diffuser member; and inflator disposed in the gas diffusion chamber; and airbag accommodated in the accommodation chamber, the airbag having a retained part thereof between the third portion of the retainer case and the diffuser member; and a gas invasion restrictor configured to restrict a gas invasion into between the third portion of the retainer case and the diffuser member.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
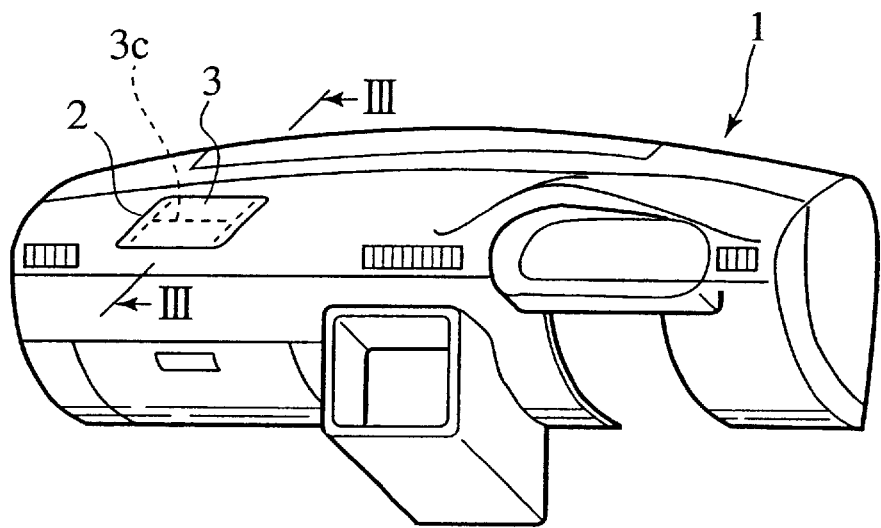
FIG. 1 is a perspective view of an instrument panel having a vehicular airbag apparatus according to an embodiment of the invention.

There will be detailed below the preferred embodiments of the present invention with reference to the accompanying drawings. Like members are designated by like reference characters.

First Embodiment

Figure 2:
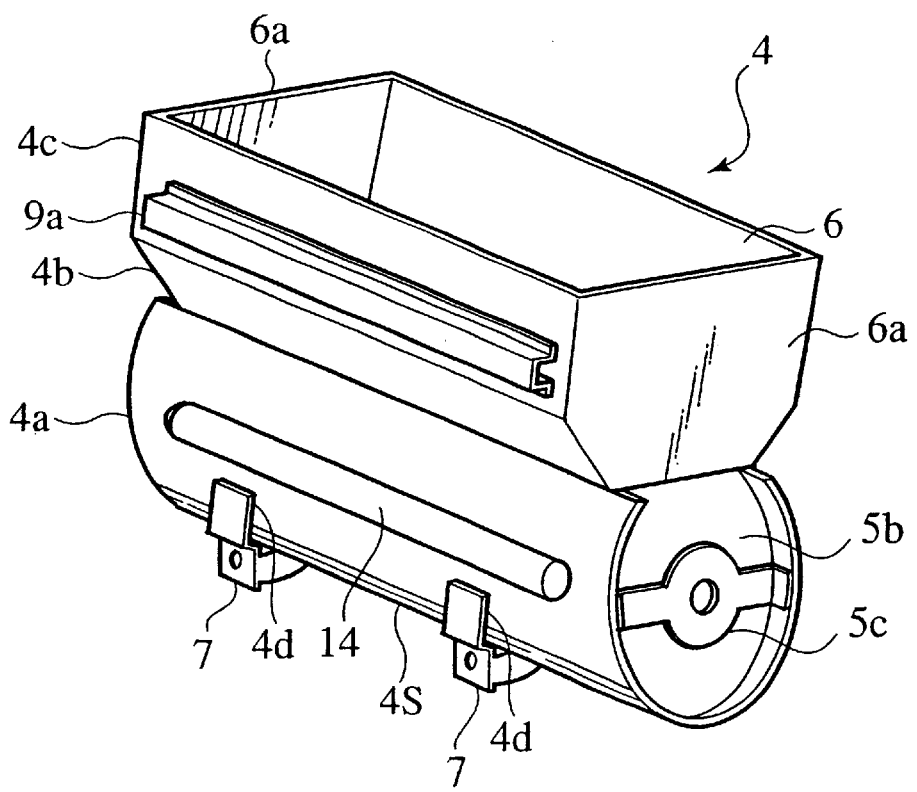
FIG. 2 is a perspective view of a retainer case of the vehicular airbag apparatus in the instrument panel of FIG. 1.
Figure 3:
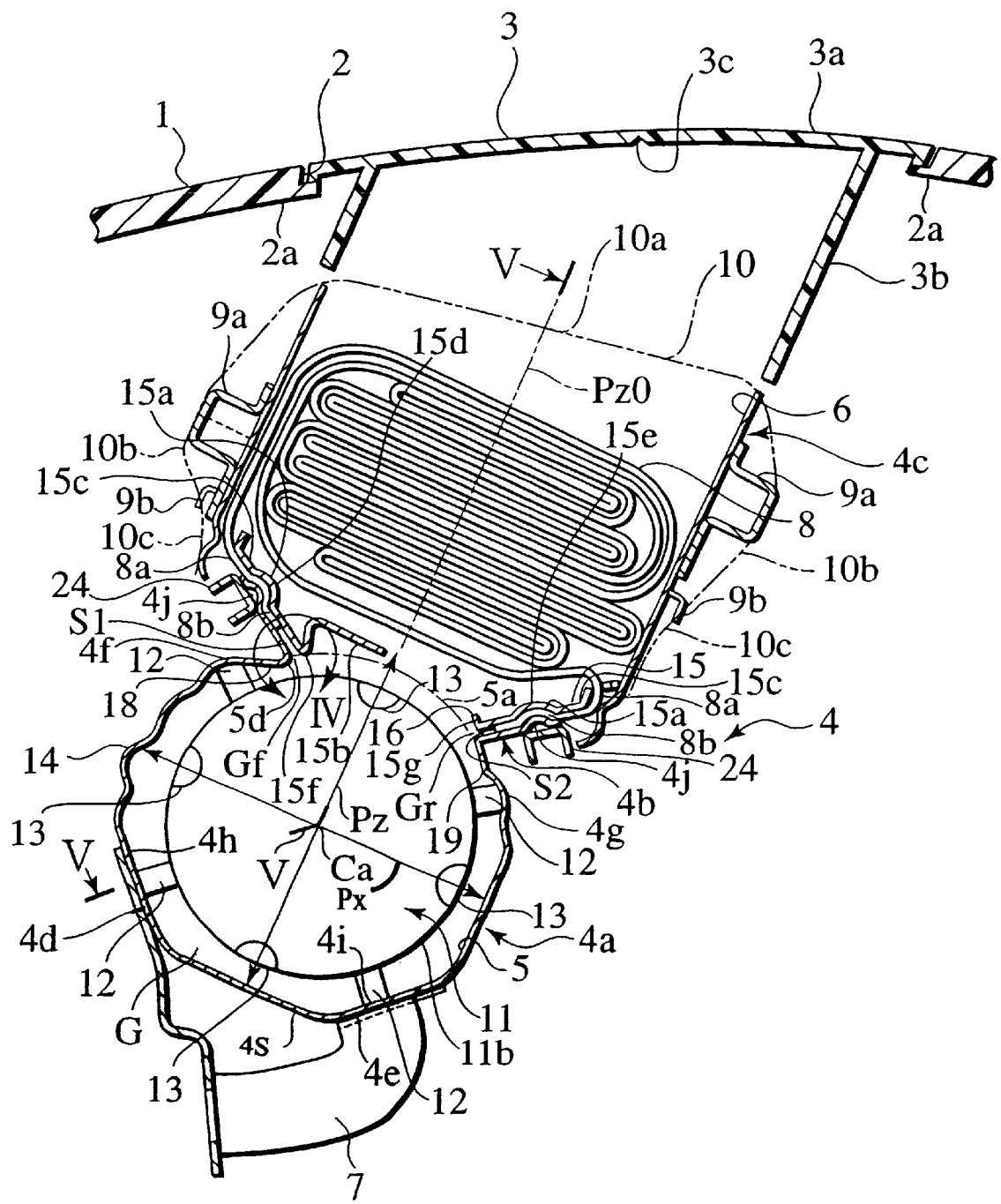
FIG. 3 is a sectional view along line III—III of FIG. 1.

Description is now made of a first embodiment of the invention, with reference to FIG. 1 to FIG. 5. In FIG. 1, designated by reference character 1 is an instrument panel vehicle-transversely extending at a front of a vehicular occupant room. The instrument panel 1 has at the navigator side (left side in FIG. 1) a rectangular opening 2 formed in the upside, and a lid member 3 fitted in the opening 2. As best shown in FIG. 3, the lid member 3 is constituted with a flat lid portion 3a which is fixed to a periphery 2a of the opening 2, and a rectangular guide wall portion 3b which extends obliquely downward from downside of the lid portion 3a. The lid portion 3a has a cut 3c at the backside, to be torn therealong in an H-form as indicated by dot lines in FIG. 1, so as to upwardly open, when pushed from below by an inflated airbag.

Below the opening 2 is provided an airbag-device-retaining casing (called "retainer case") 4 of a metallic panel structure, which is fixed in a rearward inclined position. The retainer case 4 has: an inflator-accommodating lower portion 4a (FIG. 2, FIG. 3, FIG. 4, FIG. 5) which defines a vehicle-transversely extending substantially cylindrical accommodation chamber (called "gas diffusion chamber") 5 (FIG. 3, FIG. 4, FIG. 5) that is open along an upper arcuate region 5a indicated by one-dot chain line (FIG. 3) and close at both axial ends with end plates 5b (FIG. 2, FIG. 5) of which either is removable by detachment of a stopper 5c (FIG. 2, FIG. 5); an airbag-retaining intermediate portion 4b (FIG. 2, FIG. 3, FIG. 4, FIG. 5) which is obliquely upwardly spread to be configured in a vehicle-transversely elongate rectangular funnel form that is continuous at the lower edge to a periphery 5d (FIG. 3, FIG. 4) of the upper arcuate region 5a of the gas diffusion chamber 5; and an airbag-enclosing upper portion 4c (FIG. 2, FIG. 3, FIG. 5) which is cooperative with the intermediate portion 4b to define a vehicle-transversely extending irregular-six-side-prismatic accommodation chamber (called "bag accommodation chamber") 6 (FIG. 2, FIG. 3, FIG. 5) that is open at both upper and lower sides and close at both axial ends with end plates 6a (FIG. 2). The upper portion 4c itself of the retainer case 4 is shaped in the form of a rectangular box open upward, as a guide wall congruent in section to and continuously opposing the guide wall portion 3b of the lid member 3. The upper portion 4c is constituted as a removable separate member, but normally is fixed relative to the intermediate part 4b which is integrated with the lower portion 4a.

The retainer case 4 is mounted as a whole to an unshown strong rigid member of the vehicle body, for example to a steering member, by using fixtures such as left and right three-leg brackets 7 (FIG. 2, FIG. 3, FIG. 5) each respectively attached to outsides of lower front and rear parts 4d and 4e (FIG. 2, FIG. 3, FIG. 5) of the lower portion 4a of the retainer case 4 in which the gas diffusion chamber 5 is defined.

In the bag accommodation chamber 6 is accommodated an airbag 8 (FIG. 3, FIG. 4, FIG. 5) in a folded condition. The upper portion 4c of the retainer case 4 defining the bag accommodation chamber 6 is wholly covered with a thin cover 10 put thereon for protection against invasion such as of dust. The cover 10 can be torn at a top part 10a thereof by the airbag 8 when this is inflated. Front and rear side parts 10b (FIG. 3) of the cover 10 are applied over raised fixtures 9a (FIG. 2, FIG. 3) provided on the upper portion 4c of the retainer case 4, to tense the top part 10a. Lower end parts 10c of the cover 10 are engaged with hooks 9b (FIG. 3, FIG. 5) provided on four sides of the upper portion 4c of the retainer case 4.

Figure 4:
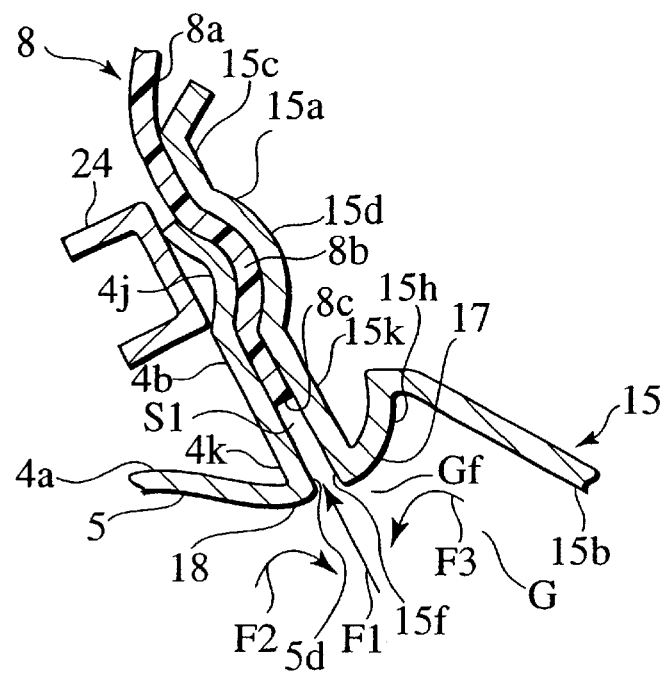
FIG. 4 is a detailed section of part IV of FIG. 3.
Figure 5:
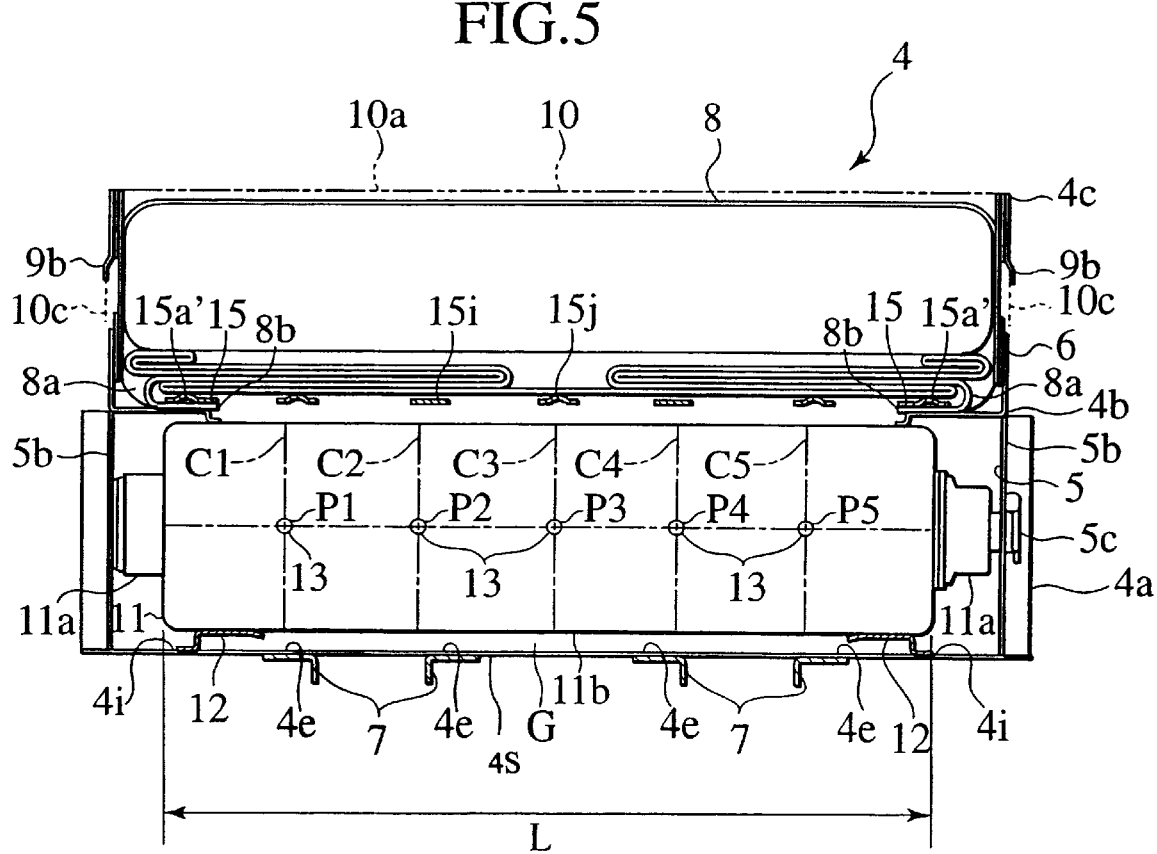
FIG. 5 is a sectional view along line V—V of FIG. 3.

In the gas diffusion chamber 5 is installed a vehicle-transversely extending cylindrical inflator 11 (FIG. 3, FIG. 5), of which left and right ends 11a (FIG. 5) are brought into abutment on both end plates 5b of the lower portion 4a of the retainer case 4, but a cylindrical body 11b(FIG. 3, FIG. 5) is spaced from a side wall 4S (FIG. 2, FIG. 3, FIG. 4) of the lower portion 4a, to be supported in a spatial position with a peripheral gap G (FIG. 3, FIG. 4, FIG. 5) left therebetween, by a total of eight resilient spacers 12 (FIG. 3, FIG. 5). The spacers 12 are arranged as left and right sets each respectively having a total of four equi-angularly spaced spacers 12 fixed to insides of upper fromt and rear parts 4f and 4g (FIG. 3) and lower front and rear parts 4h and 4I (FIG. 3, FIG. 5) corresponding in angular position to the above-noted lower front and rear parts 4d and 4e of the side wall 4S of the lover portion 4a of the retainer case 4. The body 11b of the inflator 11 is formed with a total of twenty gas discharge holes 13 (FIG. 3, FIG. 5) aligned into four axial arrays (FIG. 3) equi-angularly spaced about a center axis Ca (FIG. 3) thereof. Each axial array has five discharge holes 13 (FIG. 5) at five axial points P1 to P5 (FIG. 5) equi-dividing an axial length L (FIG. 5) of a side wall of inflator body 11b, so that, along a respective one of five circumferences C1 to C5 (FIG. 5) passing the axial points P1 to P5, a total of four gas discharge holes 13 are equi-angularly spaced. The inflator 11 installed is set in a position rotated at a specified angle so that a reference center plane Pz ((FIG. 3) of the inflator 11, which passes the center axis Ca and respective top and bottom holes 13, coincides with a reference center plane Pz0 (FIG. 3) of the inclined retainer case 4, and a plane Px (FIG. 3) perpendicular to the reference center plane Pz and passing the center axis Ca of the inflator 11 passes respective front and rear holes 13. The above-noted upper and lower front and rear parts 4d and 4e, 4f and 4g, and 4h and 4i of the side walls 4S, where the brackets 7 and/or the spacers 12 are mounted, are located on or near bisecting planes of four quadrants between the planes Pz and Px, so that the brackets 7 and the spacers 12 as well as their mounting structures are best positioned to be free from significant thermal effects of hot gases from the inflator 11.

The side wall 4S of the lower portion 4a of the retainer case 4 is formed with a vehicle-transversely extending front bead 14 (FIG. 2, FIG. 3) in front of the front gas discharges holes 13, serving as an outward bulged portion to increase the rigidity of the retainer case 4, and concurrently as an outward recess to receive discharged gases from the holes 13. Like bead may be formed in opposition to any rear or bottom gas discharge hole 13 of the inflator 11.

The intermediate portion 4b of the retainer case 4 has a rectangular diffuser member 15 (FIG. 3, FIG. 4, FIG. 5) fitted therein, with a peripheral part 8b (FIG. 3, FIG. 4, FIG. 5) of a gas introducing inlet 8a (FIG. 3, FIG. 4, FIG. 5) of the airbag 8 inserted therebetween. The diffuser member 15 is integrally formed with a rectangular main portion 15a (FIG. 3, FIG. 4, FIG. 5), an inward extended portion 15b (FIG. 3, FIG. 4, FIG. 5), and an outward flanged portion 15c (FIG. 3, FIG. 4). The main portion 15a of the diffuser member 15 is upwardly raised at the inside to be recessed at the outside, so as to cooperate with raised spread ends 4j (FIG. 4) of the intermediate part 4b of the retainer case 4, which are supported from below by vehicular front and rear cross members 24 (FIG. 3, FIG. 4) fixed in position, for retaining therebetween the peripheral part 8b of the gas introducing inlet 8a of the airbag 8. The main portion 15a is constituted with a vehicle-transversely extending front part 15d (FIG. 3, FIG. 4), vehicle-longitudinally extending left and right side parts 15a' (FIG. 5), and a vehicle-transversely extending rear part 15e (FIG. 3). The rear part 15e of the main portion 15a has an upwardly bent front edge 15g (FIG. 3). The inward extended portion 15b of the diffuser member 15 is once bent upward at an inner or rear end 15f (FIG. 3, FIG. 4) of the front part 15d of the main portion 15a, to have a stepped part 15h (FIG. 4), and then inwardly or rearwardly extended therefrom, and is furcated to provide beams 15i (FIG. 5), which may be joined to the front edge 15g of the rear part 15e of the main portion 15a, and grids 15j (FIG. 5) for receiving the folded airbag 8. The inward extended portion 15b, is configured to cooperate with the left and right sides parts 15a' and the rear part 15e of the main portion 15a to define a gas inlet 16 (FIG. 3) in direct communication with the gas introducing inlet 8a of the airbag 8. The gas inlet 16 is angularly offset clockwise (FIG. 3) relative to the top gas discharge holes 13 of the inflator 11, to thereby effect adequate diffusion of gas in the gas diffusion chamber 5, or more specifically, along the gap G between the inflator 11 and wall of the lower portion 4a of the retainer case 4. The outward flanged portion 15c (FIG. 3, FIG. 4) is spread as an outward extension of the main portion 15a for fixation by unshown fastening elements, such as bolts and nuts, to the upper portion 4c of the retainer case 4, and bent upward at the end to facilitate application of the gas introducing inlet 8a of the airbag, 8. The raised front part 15d of the main portion 15a may be fastened tight, together with the raised spread ends 4j, to the cross members 24 or the like.

The stepped part 15h of the inward extended portion 15b cooperates with a straight rear part 15k (FIG. 4) including the rear end 15f of the front part 15d of the main portion 15a of the diffuser member 15, to constitute a vehicle-transversely extending inward projection 17, or more specifically, an acute-angled inward projection outlined in section like two flat sides of a triangular prism. Likewise, the periphery 5d of the upper arcuate region 5a (FIG. 3) of the gas diffusion chamber 5 cooperates with an inner end 4k (FIG. 4) of the intermediate portion 4b of the retainer case 4 to constitute an acute-angled inward projection 18 (FIG. 3, FIG. 4) into an upper front region Gf (FIG. 3, FIG. 4) of the gap G between the inflator 11 and the lower portion 4a of the retainer case 4, where gases discharged from the inflator 11 are yet being diffused, and a substantially right-angled inward projection 19 into an upper rear region Gr (FIG. 3) of the gap G, where discharged gases are diffused enough to be introduced into the clockwise offset gas inlet 8a. The inward projections 17 and 18 cooperate with each other to define therebetween a straight gap or space S1 (FIG. 3, FIG. 4) as a relatively thin and deep gaseous fluid path stopped by a corresponding part of an edge 8c (FIG. 4) of the peripheral part 8b of the gas introducing inlet 8a of the airbag 8. The space S1 is by far higher in fluid resistance than the upper front region Gf of the gap G, where high-pressure, high-temperature gases thus have reduced tendencies to flow along streamline Ft into the space S1, so that gases are diffused along streamlines F2 and F3. Likewise, the inward projection 19 cooperates with the front edge 15g of the rear part 15e of the main portion 15a of the diffuser member 15 to define therebetween a straight gap or space S2 (FIG. 3) as a relatively thin and shallow gaseous fluid path stopped by a corresponding part of the edge 8c of the peripheral part 8b of the gas introducing inlet 8a of the airbag 8. The space S2 is higher in fluid resistance than the upper rear region Gr of the gap G, where diffused gases have reduced tendencies to flow into the space S2. The corresponding parts of the edge 8c of the airbag 8 are spaced along the spaces S1 and S2 at effectively increased distances from the gap G.

Upon detection of a greater sudden deceleration of or impact on the vehicle than specified, an unshown sensor is operated to send a deployment signal to the inflator 11, whereby a chemical in the inflator 11 is ignited, and high-pressure, high-temperature gases are discharged from the gas discharge holes 13 into the gas diffusion chamber 5. Discharged gases fill the gas diffusion chamber 5 in a diffused state, so that diffused gases are sent via the gas inlet 16 and the gas introducing part 8a into the airbag 8, which is thereby inflated. In the course of inflation, the airbag 8 guided by the guide wall portion 3b tears the lid portion 3a of the lid member 3, deploying inside the occupant room, thereby receiving an occupant seated on an navigator sheet, to protect the occupant from falling forward.

According to this embodiment, although a front end of an airbag 8 confronts a gas diffusion chamber 5 through a gap or space S1, because a path length or distance increasing structure configured with inward projections 17 and 18 is provided on or near both opposite sides of the space S1, the length of a path between from inside of the gas diffusion chamber 5 to the end of the airbag 8 is effectively elongated along the space Si, or more specifically (as is understood herein) along one of or along a centerline between opposing contours or surfaces of the projections 17 and 18, so that gases entering the space S1 have a little lowered temperatures when brought into contact with the end of the airbag 8, which thus hardly receives undue thermal effects from hot gases. Moreover, around an entrance of the space S1, gases tend to flow along inclined surfaces of the inward projections 17 and 18, like streams of convection, and have tendencies reduced by the projections 17 and 18 to flow into the space S1, where thermal effects are reduced accordingly. At an opposite (rear) side of the airbag 8, where another space S2 is adjacent to a relatively large gas inlet 16, gases wholly flow toward the gas inlet 16, with yet reduced tendencies to enter the space S2, which is thus inherently subject to little thermal effects. It should however be noted that the front edge 15g of the rear part 15e of the main portion 15a of the diffuser member 15 may also be formed with an inward projection analogous to the projection 17 at the front side. It should also be noted that the projections 17 and 18 constitute a gas invasion restricting structure for restricting an invasion of gas from the diffusion chamber 5 along the space S1, i.e. a gas invasion into between the intermediate portion 4b of the retainer case 4 and the diffusion member 15.

Further, because a portion 4a of a retainer case 4 defining the diffusion chamber 5 has a bead 14 formed therein in correspondence to front gas discharge holes 13 of the inflator 11, the bead 14 has a greater distance than other inside surfaces of the portion 4a relative to the gas discharge holes 13, so that the retainer case 4 is subject to smaller thermal effects than ever. This reduction of thermal effects at a gas contacting surface (bead 14) of the retainer case allows fixtures, such as brackets 7, to be attached to the retainer case 4 at closer positions to the gas contacting surface than ever.

Second Embodiment

Figure 6:
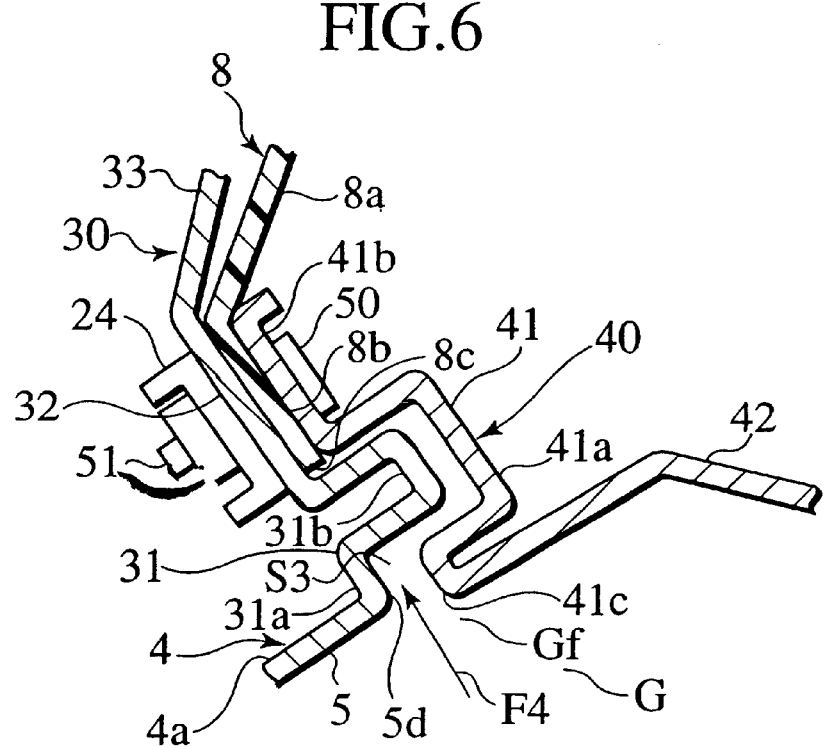
FIG. 6 is a sectional view of a corresponding part to FIG. 4 in an airbag apparatus according to another embodiment of the invention.

FIG. 6 shows a second embodiment of the invention. In this embodiment, an intermediate portion 30 of a retainer case 4 has: a non-linear base part 31 formed with a base end 31a frontwardly upwardly bent from a peripheral part 5d of a lower portion 4a of the retainer case 4, and a deformed part 31b deformed in an inverted-U form; a mounting part 32 extending frontwardly upward from a front end of the deformed part 31b; and a distal end part 33 extending upward from a front end of the mounting part 32.

A diffuser member 40 is integrally formed with a main portion 41 rectangular in plan, and an inward extended portion 42 provided as a rearward extension of a front part of the main portion 41. The main portion 41 is formed with: a non-linear deformed part 41a deformed in an inverted-U form similar to and loose-fitted on the non-linear base part 31 of the above-noted intermediate portion 30, with a non-linear (i.e. inverted-U) connected space S3 left as a gap therebetween; and a retaining part 41b extending frontwardly upward from a front end of the deformed part 41a. The retaining part 41b is fastened tight to a vehicular cross member 24, by bolts 50 and nuts 51, together with the mounting part 32 of the intermediate portion 30, with a peripheral part 8b of a gas introducing inlet 8a of an airbag 8 inserted therebetween. The inward extended portion 42 is once bent rearwardly upward at a rear end 41c of the non-linear deformed part 41a, and extended rearward like the first embodiment.

The non-linear space S3 is defined as a relatively tin and deep U-shaped gaseous fluid path stopped by a corresponding part o edge 8c of the peripheral part 8B of the gas introducing inlet 8a of the airbag 8. The space S3 is much higher in fluid resistance than an upper front region Gf of a gap G, where high-pressure, high-temperature gases having reduced tendencies to slow along streamline F4 into the space S3.

According to this embodiment, because a front end of an airbag 8 indirectly confronts a gas diffusion chamber 5 through an inverted-U shape space S3, which is defined by a path length or distance increasing structure configured with deformed parts 31 and 41a provided on both opposite sides of the space S3, the length of a path between from inside of the gas diffusion chamber 5 to the end of the airbag 8 is effectively elongated along the space S3, so that gases entering the space S3 have lowered temperatures when brought into contact with the end of the airbag 8, which thus hardly receives undue thermal effects from hot gases.

Third Embodiment

Figure 7:
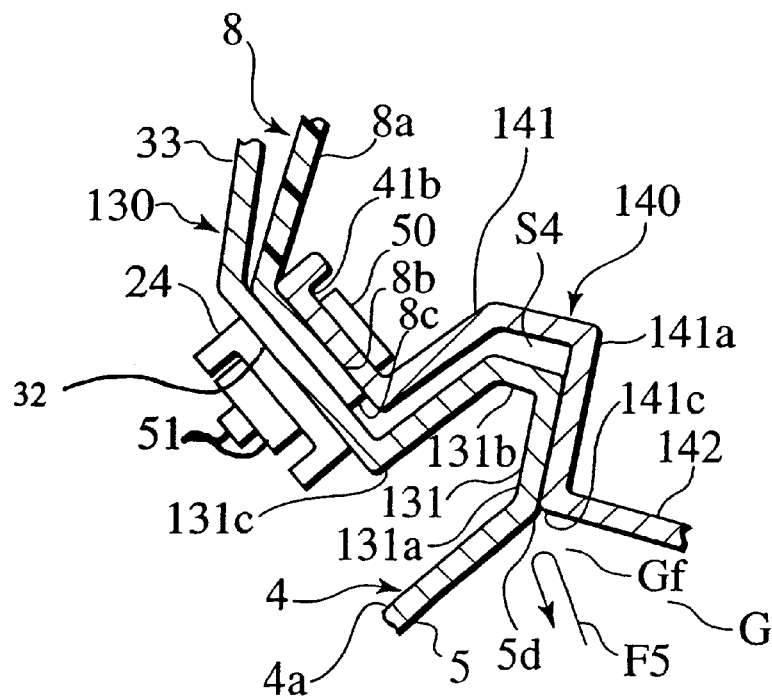
FIG. 7 is a sectional view of a corresponding part to FIG. 4 in an airbag apparatus according to another embodiment of the invention.

FIG. 7 shows a third embodiment of the invention. In this embodiment, an intermediate portion 130 of a retainer case 4 has a non-linear base part 131 formed with: a base end 131a frontwardly upwardly bent from a peripheral part 5d of a lower portion 4a of the retainer case 4; a deformed part 131b deformed in an inverted-V form; and a connection part 131c for connection of the deformed part 131b to a mounting part 32 of the intermediate portion 131. A diffuser member 140 is integrally formed with a main portion 141 rectangular in plan, and an inward extended portion 142 provided as a rearward extension of a front part of the main portion 141. The main portion 141 is formed with a non-linear deformed part 141a and a retaining part 41b. The non-linear deformed part 141a is deformed in an inverted-V form similar to and loose-fitted on the non-linear base part 131 of the above-noted intermediate portion 130, with the latter 131 one-sided, so that a rear side of the latter 131 is brought into abutment on a rear side of the former 141a, and a non-linear (i.e. half-V) connected space S4 is left as a gap between a front side of the former 141a and a front side of the latter 131. The inward extended portion 142 is bent at a rear end 141c of the non-linear deformed part 141a, and extended rearward like the first embodiment.

The non-linear space S4 is defined as a relatively thin half-V-shaped gaseous fluid path stopped at the front end by a corresponding part of an edge 8c of a peripheral part 8b of a gas introducing inlet 8a of an airbag 8, and at the rear end by the rear side of the non-linear base part 131 abutting on the rear side of the non-linear deformed part 141a. The space S4 is extremely high in fluid resistance relative to an upper front region Gf of a gap G, where high-pressure, high-temperature gases have tendencies to flow along turning streamline F5.

According to this embodiment, because a front end of an airbag 8 is substantially isolated from a gas diffusion chamber 5 by a path length or distance increasing structure configured with deformed parts 131 and 141a provided on both opposite sides of a space S4, gases in the diffusion chamber 5 is substantially kept from contacting the front end of the air bag 8, which is thus kept free from undue thermal effects of hot gases.

The contents of Japanese Patent Application No. 2000-30630 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A vehicular airbag apparatus comprising:
   a retainer case having a first portion defining a gas diffusion chamber, a second portion defining an accommodation chamber, and a third portion between the first and second portions;
   a diffuser member separating the gas diffusion chamber from the accommodation chamber, with a gas communication allowed therebetween through an opening of the diffuser member;
   a gas-communicable space remaining between the third portion of the retainer case and the diffuser member and gas-communicable with the gas diffusion chamber;
   an inflator disposed in the gas diffusion chamber;
   an airbag accommodated in the accommodation chamber, the airbag having a peripheral part thereof retained between the third portion of the retainer case and the diffuser member, with an end part thereof confronting the gas-communicable space; and
   a gas invasion restrictor configured to restrict a gas invasion from the gas diffusion chamber into the gas-communicable space.

2. A vehicular airbag apparatus according to claim 1, wherein the gas invasive restrictor comprises part of one of the third portion of the retainer case and the diffuser member configured to provide a hot gas in the diffusion chamber with a reduced tendency to enter the gas-communicable space.

3. A vehicular airbag apparatus according to claim 1, wherein the gas invasion restrictor comprises part of one of the third portion of the retainer case and the diffuser member configured to provide an elongated gas flow path between the end part of the peripheral part of the airbag and the gas diffusion chamber.

4. A vehicular airbag apparatus according to claim 1, wherein the gas invasion restrictor comprises a projected part of the third portion of the retainer case and a projected part of the diffuser member.

5. A vehicular airbag apparatus according to claim 1, wherein the gas invasion restrictor comprises a non-linear gap between the third portion of the retainer case and the diffuser member.

6. A vehicular airbag apparatus to claim 1, further comprising a recess formed in the first portion of the retainer case in opposition to a gas discharge hole of the inflator.

7. a vehicular airbag apparatus according to claim 1, wherein the first portion of the retainer case has a fixed to a vehicle body member, and a total number of discharge holes of the inflator are offset in angular position relative to the fixed part.

8. A vehicular airbag apparatus according to claim 1, wherein the inflator is supported by spacers in the first portion of the retainer case, a total number of discharge holes of the inflator being offset in angular position relative to the spacers.

9. A vehicular airbag apparatus comprising:
   a retainer case having a first portion defining a gas diffusion chamber, a second portion defining an accommodation chamber, and a third portion between the first and second portions;
   a diffuser member separating the gas diffusion chamber from the accommodation chamber, with gas communication allowed therebetween through an opening of the diffuser member;
   a gas-communicable space remaining between the third portion of the retainer case and the diffuser member and gas-communicable with the gas diffusion chamber;
   an inflator disposed in the gas diffusion chamber;
   an airbag accommodated in the accommodation chamber, the airbag having a peripheral part thereof retained between the third portion of the retainer case and the diffuser member, with an end part thereof confronting the gas-communicable space; and
   gas invasion restricting means for restricting a gas invasion from the gas diffusion chamber into the gas-communicable space.

10. A vehicular airbag apparatus according to claim 9, wherein the gas invasion restricting means comprises means for providing a hot gas in the diffusion chamber with a reduced tendency to enter the gas-communicable space.

11. A vehicular airbag apparatus according to claim 9, wherein the gas invasion restricting means comprises means for providing an elongated gas flow path between the end part of the peripheral part of the airbag and the gas diffusion chamber.

* * * * *